United States Patent Office 3,288,835
Patented Nov. 29, 1966

3,288,835
3-ALKOXY-4-[(N-SUBSTITUTED-CARBAMYL)-ALK-OXY]-PHENYL ACETIC ACID ESTERS
Rudolf Hiltmann and Hartmund Wollweber, Wuppertal-Elberfeld, Friedrich Hoffmeister, Wuppertal-Vohwinkel, and Wolfgang Wirth, Wuppertal-Elberfeld, Germany, assignors to Farbenfabriken Bayer Aktiengesellschaft, Leverkusen, Germany, a corporation of Germany
No Drawing. Filed Dec. 18, 1962, Ser. No. 245,406
Claims priority, application Germany, Dec. 20, 1961, F 35,599
4 Claims. (Cl. 260—471)

This invention relates, in general, to a new class of substituted 3,4-dihydroxy phenyl acetic acid esters and to various different syntheses applicable to the production of the specific compounds in point. More particularly, the invention involves the provision of novel 3-alkoxy-4-[(N-substituted-carbamyl)-alkoxy]-phenyl acetic acid esters which possess valuable physiological utility by virtue of their unique efficacy as ultra-short-acting anaesthetics.

In copending United States application Serial No. 130,700, which was filed on May 5, 1961, now Patent No. 3,086,978, issued April 23, 1963, there are described and claimed a series of 3-alkoxy-4-[(N-substituted-carbamyl)-alkoxy]-phenyl acetic acid esters which are characterized by good short-acting anaesthetic effects.

The present invention is based, at least in part, on the discovery that the compounds of the general class defined, which shall be described in greater detail hereinafter, constitute a further type of intravenously-administrable anaesthetic which are possessed of even superior ultra-short-acting anaesthetic effects and, surprisingly, complete absence of any so-called "barbiturate hang-over."

The novel compounds of the invention may be represented in general by the following structural formula:

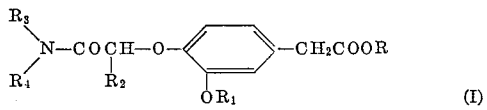

(I)

wherein R represents a saturated or unsaturated lower alkyl radical of straight- or branched-chain configuration; $R_1$ represents a lower alkyl radical, and preferably either a methyl or ethyl group; $R_2$ represents hydrogen or a methyl or ethyl group; $R_3$ represents hydrogen or a lower alkyl radical; and $R_4$ represents an alkoxy group; and wherein the substituents $R_3$ and $R_4$ may be joined with the nitrogen atom of the 4-positioned side-chain to form a heterocyclic ring including, for example, a 2-oxapyrrolidyl or 2-oxapiperidyl radical.

The novel compounds of the invention may be produced by several alternate syntheses. Thus, 3-alkoxy-4-hydroxyphenyl acetic acid esters of the formula:

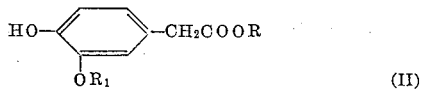

(II)

wherein R and $R_1$ have the same meaning as assigned above, can be reacted with reactive esters of glycollic acid amides of the formula:

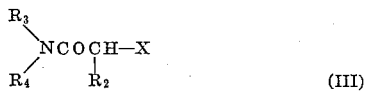

(III)

wherein $R_2$, $R_3$ and $R_4$ also have the same meaning as assigned above, and X denotes a reactive group such as halogen, alkylsulphonyl or arylsulphonyl, and the like.

Alternatively, 3-alkoxy-4-(α-carboxyalkoxy)-phenyl acetic acid esters of the same general structure illustrated by Formula I above, but carrying a carboxylic acid grouping in lieu of the N-substituted carbamyl radical ($NH_2CO$—) at the terminal end of the 4-positioned side-chain, or derivatives thereof which have been functionally modified in that carboxyl grouping, as, for example, esters, mixed anhydrides or acid halides, can be reacted with amines of the formula:

(IV)

wherein $R_3$ and $R_4$ have the same meaning as assigned above, or with reactive derivatives of such amines such as the corresponding chlorocarbonic acid amides or ester amides of sulphurous acid.

In addition, phenyl acetic acids of the formula:

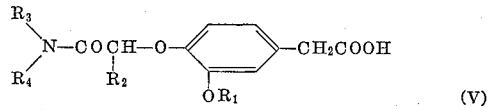

(V)

wherein $R_1$, $R_2$, $R_3$, and $R_4$ have the same meaning as assigned above, or reactive derivatives of such acids such as esters, acid chlorides, mixed anhydrides, or salts thereof, can be transformed into the corresponding desired esters by reacting the same with saturated or unsaturated, straight- or branched-chain alcohols, or with reactive derivatives of the same such as acyl derivatives, halides or tosylates.

Lastly, by reference to the above-identified copending United States application, one may treat the 3-alkoxy-4-[(N-substituted-carbamyl)-alkoxy]-benzoic acid esters by transesterification to produce the novel phenyl acetic acid esters of the present invention.

To illustrate the unique pharmacological utility of the compounds of the invention, a typical compound, namely, the 3-methoxy-4-[(N-ethoxy-N-ethyl-carbamyl)-methoxy]-phenyl acetic acid isopropyl ester as produced in accordance the procedures described in Example II presented hereinafter was tested in comparative studies via intravenous administration in dogs with the well known sodium salt of 5-methyl-5-cyclohexenyl-N-methyl barbituric acid. The results of these studies are presented in tabulated form below:

TABLE

| | Product of Example II | Control Product |
|---|---|---|
| (A) Dose, mg./kg. | 15 | 40 |
| (B) Anaesthesia Stage [1] | VI | VI |
| (C) Total Duration of Anaesthesia, minutes | 26 | 166 |
| (D) Duration of Anaesthesia from VI–IV as percentage of total duration of anaestheaia, percent | 54 | 17 |
| (E) $LD_{50}$ mg./kg. rabbit i.V. | ~50 | 70 |

[1] Anaesthesia stage VI corresponds, according to Magnus-Girndt, to deep anaesthesia with complete absence of reflexes (i.e., tolerance stage), whereas anaesthesia stage IV corresponds to lateral position maintaining corneal and pinch reflex. The time interval between anaesthesia stage VI and stage IV provides an approximate measure of the time available for surgical action.

As reference to the foregoing results demonstrates, it is apparent that a reduced dosage level of the compound of the invention is capable of achieving the same depth of anaesthesia as can be produced with the conventional anaesthetic only at higher dosage levels, and that the total duration of anaesthesia is considerably shorter for the product of the invention than that effected through use of the control product. In the latter respect, the total duration of anaesthesia denotes the time interval between the setting in of anaesthesia and the disappearance of any anaesthetic symptoms, that is, the time at which the animal behaves in a completely normal manner. As applied to humans, this time interval indicates or symbolizes the "street or ambulatory fitness" of the anaesthetized patient. Substantially similar results have been obtained in the application of the same test procedures to rabbits.

Significantly, the unique short-acting narcotic or soporific properties of the compounds of the invention lead to a considerably earlier street fitness than standard anaesthetic agents as, for example, the popular control agent identified above; this factor being of decisive importance in minor surgery where an anaesthesia of very short duration is desired or required. Apart from the specific control agent identified above, such short-acting anaesthetic properties, capable also of achieving the full tolerance stage required, have hitherto been unknown and unavailable in any intravenously administrable commercial form of anaesthetic.

It is believed that the invention may be best understood by reference to the following specific examples illustrating the application of the foregoing principles and procedures in the preparation of typical compounds of the invention.

*Example I*

Homovanillic acid n-propyl ester (boiling point 140° C./0.4 mm. Hg), in amount of 67.2 grams, was heated under reflux for 12 hours with 51.2 grams of chloroacetic acid-N-ethoxy-N-ethyl amide and 45 grams of potassium carbonate in 125 milliliters of acetone. After filtering off with suction, the filtrate was taken up in ether and shaken out with a cold 10 percent sodium hydroxide solution. The ether solution was dried over sodium sulphate and subjected to fractional distillation to yield 85.7 grams (81%) of the compound 3-methoxy-4-[(N-ethoxy-N-ethyl-carbamyl)-methoxy]-phenyl acetic acid n-propyl ester (boiling point 215–216° C./0.5 mm. Hg).

*Example II*

Homovanillic acid isopropyl ester (boiling point 126° C./0.3 mm. Hg), in amount of 16.4 grams, was heated under reflux for 16 hours with 13.2 grams of chloroacetic acid-N-ethoxy-N-ethyl amide and 11 grams of potassium carbonate in 50 milliliters of acetone. The reaction mixture was worked-up in accordance with the procedure described in Example I to yield 18.3 grams of the compound, 3 - methoxy - 4 - [(N-ethoxy-N-ethyl-carbamyl)-methoxy]-phenyl acetic acid isopropyl ester (boiling point 200–202° C./0.3 mm. Hg).

*Example III*

Homovanillic acid ethyl ester (boiling point 153–156° C./5 mm. Hg), in amount of 13.4 grams, was heated under reflux for 10 hours with 11.6 grams of chloroacetic acid-N-ethoxy-N-ethyl amide and 9.6 grams of potassium carbonate in 50 milliliters of acetone. The reaction mixture was worked-up in accordance with the procedure described in Example I to yield 17.8 grams of the compound, 3-methoxy - 4-[(N-ethoxy-N-ethyl-carbamyl)-methoxy]-phenyl acetic acid ethyl ester (boiling point 201–203° C./0.3 mm. Hg).

*Example IV*

3-methoxy-4-carboxymethoxy phenyl acetic acid n-propyl ester, in amount of 28.2 grams, was dissolved in 200 milliliters of benzene, 0.5 milliliter of dimethyl formamide were added, 12.5 grams of thionyl chloride were added in dropwise fashion, and the resulting mixture was heated for 2 hours to 80° C. The solvent was subsequently evaporated under vacuum, the residue was taken up in 200 milliliters of benzene, and 18.5 grams of N,O-diethylhydroxyl amine were added in dropwise manner at 20° C. After heating for 1 hour under reflux and filtering-off, the unreacted carboxylic acid was removed from the benzene solution by extraction with a solution of sodium carbonate. After drying over sodium sulphate and distillation under vacuum, there was produced 20.3 grams of the compound, 3-methoxy-4-[(N-ethoxy-N-ethyl-carbamyl)-methoxy]-phenyl acetic acid n-propyl ester (boiling point 215–216° C./0.5 mm. Hg).

The 3-methoxy-4-carboxymethoxy phenyl acetic acid n-propyl ester used as the starting material in the foregoing synthesis was produced by reacting 44.8 grams of homovanillic acid n-propyl ester with 25.6 grams of sodium chloroacetate in the presence of a solution of 4.6 grams of sodium in 200 milliliters of n-propanol. The compound has the melting point 57–58° C.

*Example V*

3-methoxy-4-[(N-ethoxy-N-ethyl-carbamyl)-methoxy]-phenyl acetic acid, in amount of 20 grams, which was obtained from the propyl ester by saponification with alkali, was heated under reflux for 12 hours with 50 milliliters of pyrocarbonic acid ethyl ester. After the reaction had terminated, the mixture was fractionated under vacuum to yield 21 grams of 3-methoxy-4-[(N-ethoxy-N-ethyl-carbamyl)-methoxy]-phenyl acetic acid ethyl ester (boiling point 201–203° C./0.3 mm. Hg).

*Example VI*

The compound, 3-methoxy-4-[(N,N-diethylcarbamyl)-methoxy]-phenylacetic acid methyl ester produced in accordance with the procedures described in Example I of the above-identified copending United States application Serial No. 130,700, in amount of 60 grams, was dissolved in 300 milliliters of n-propanol and, after the addition of 0.2 gram of sodium propylate, the mixture was heated in an efficacious column until no more methanol distilled over. After driving out the excess of propyl alcohol, the mixture was distilled in vacuum, yielding 51 grams of the compound, 3 - methoxy - 4 - [(N,N - diethylcarbamyl)-methoxy]-phenyl acetic acid n-propyl ester of boiling point 212–214° C./0.6 mm. Hg.

What is claimed is:

1. A chemical compound represented by the formula:

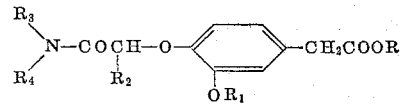

wherein R is a member selected from the group consisting of lower alkyl radicals; $R_1$ is a member selected from the group consisting of methyl and ethyl; $R_2$ is a member selected from the group consisting of hydrogen, methyl and ethyl; $R_3$ is a member selected from the group consisting of hydrogen and lower alkyl radicals; $R_4$ is an alkoxy radical; and $R_3$ and $R_4$ may be joined with the nitrogen atom to form a heterocyclic ring member selected from the group consisting of 2-oxapyrrolidyl and 2-oxapiperidyl.

2. The chemical compound, 3-methoxy-4-[(N-ethoxy-N-ethyl-carbamyl)-methoxy]-phenyl acetic acid n-propyl ester.

3. The chemical compound, 3-methoxy-4-[(N-ethoxy-N-ethyl-carbamyl)-methoxy]-phenyl acetic acid isopropyl ester.

4. The chemical compound, 3-methoxy-4-[(N-ethoxy-N - ethyl - carbamyl) - methoxy]-phenyl acetic acid ethyl ester.

References Cited by the Examiner
UNITED STATES PATENTS

| | | | |
|---|---|---|---|
| 2,534,567 | 12/1950 | Baltzly et al. | 260—471 |
| 2,642,456 | 6/1953 | Emerson et al. | 260—471 |
| 2,993,831 | 7/1961 | Shapiro et al. | 167—52 |
| 3,044,931 | 7/1962 | Holstius | 167—52 |
| 3,086,978 | 4/1963 | Hiltmann et al. | 260—471 |

LORRAINE A. WEINBERGER, *Primary Examiner.*

LEON ZITVER, *Examiner.*

D. D. HORWITZ, V. GARNER, *Assistant Examiners.*